United States Patent

Cross

[11] 4,040,531
[45] Aug. 9, 1977

[54] BALE HANDLING APPARATUS

[76] Inventor: Bryan C. Cross, R.R. No. 3, Box 135, Bedford, Iowa 50833

[21] Appl. No.: 639,276

[22] Filed: Dec. 10, 1975

[51] Int. Cl.² ............................................. A01D 87/12
[52] U.S. Cl. .............................. 214/77 R; 214/147 R; 214/350; 214/DIG. 4
[58] Field of Search .................... 214/501, 504, 77 R, 214/147 R, 147 T, 147 G, DIG. 4, 351, 352, 350, 450, 148, 146.5, 130 C, 86 A, 505, 506

[56] References Cited

U.S. PATENT DOCUMENTS

| | | | |
|---|---|---|---|
| 2,793,774 | 5/1957 | Lovegreen | 214/505 |
| 3,557,981 | 1/1971 | Seymour | 214/146.5 |
| 3,877,595 | 4/1975 | Edelman | 214/DIG. 4 |
| 3,896,956 | 7/1975 | Hostetler | 214/501 |
| 3,938,682 | 2/1976 | Rowe | 214/501 |
| 3,946,887 | 3/1976 | Parker | 214/147 G |

FOREIGN PATENT DOCUMENTS 189,121  4/1956  Austria ................................ 214/350

Primary Examiner—L. J. Paperner
Assistant Examiner—Lawrence E. Williams
Attorney, Agent, or Firm—Rudolph L. Lowell

[57] ABSTRACT

The bale handling apparatus has a portable frame with a forwardly projected tongue connectible with a tractor and rear end sections pivotally connected to wheel and axle units secured together by a transverse connecting means. A bale engaging and lifting structure on the transverse connecting means is pivotally movable about the axes of rotation of the wheels from a bale loading position projected upwardly and rearwardly from the connecting means to a bale transport position projected upwardly and forwardly from such connecting means wherein the bale is supported on the frame forwardly of the wheel axes. When a bale is to be loaded, the apparatus is manipulated to initially locate the bale engaging and lifting structure such that opposite ends of the bale are engaged when the structure is backed into the bale.

14 Claims, 10 Drawing Figures

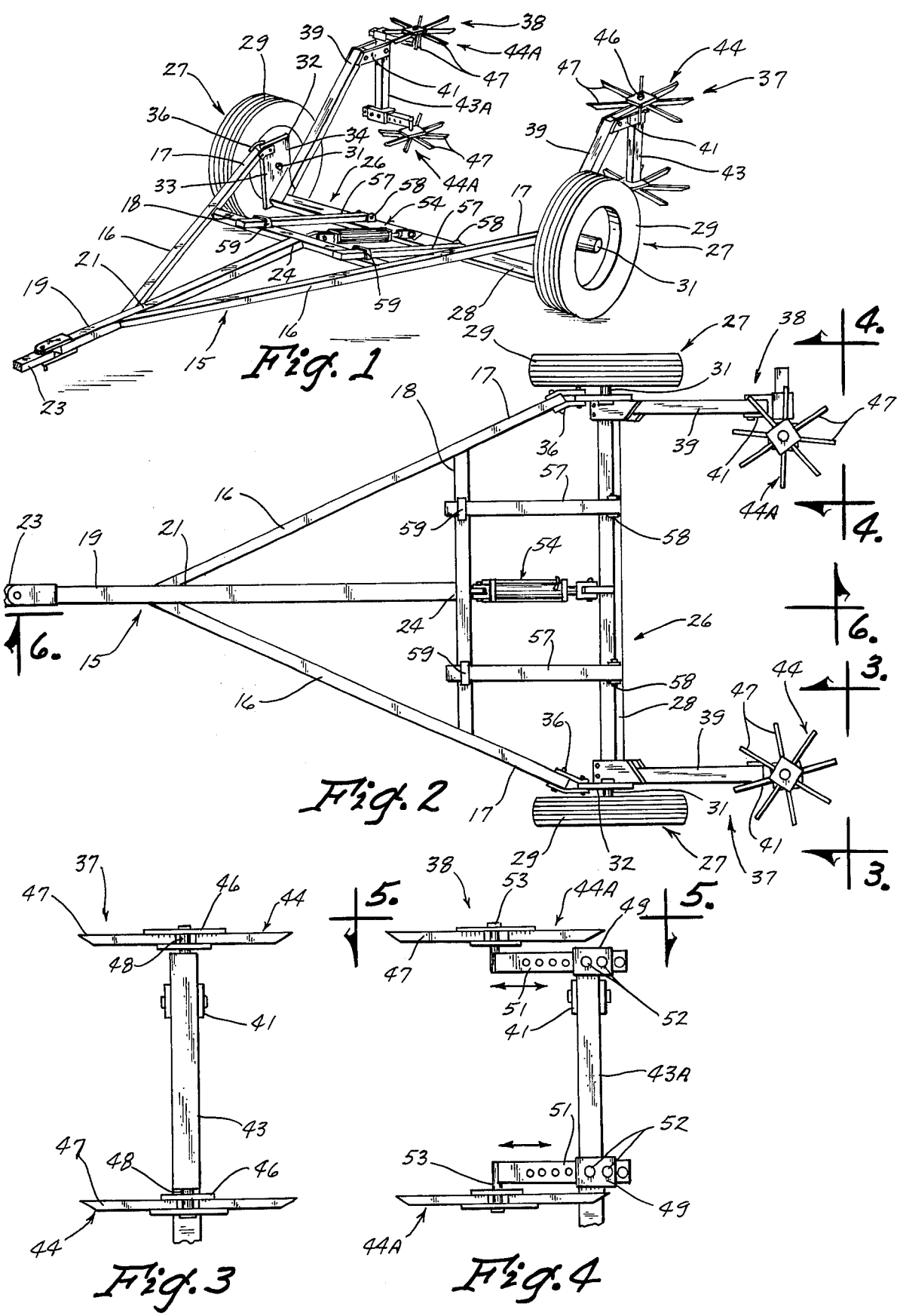

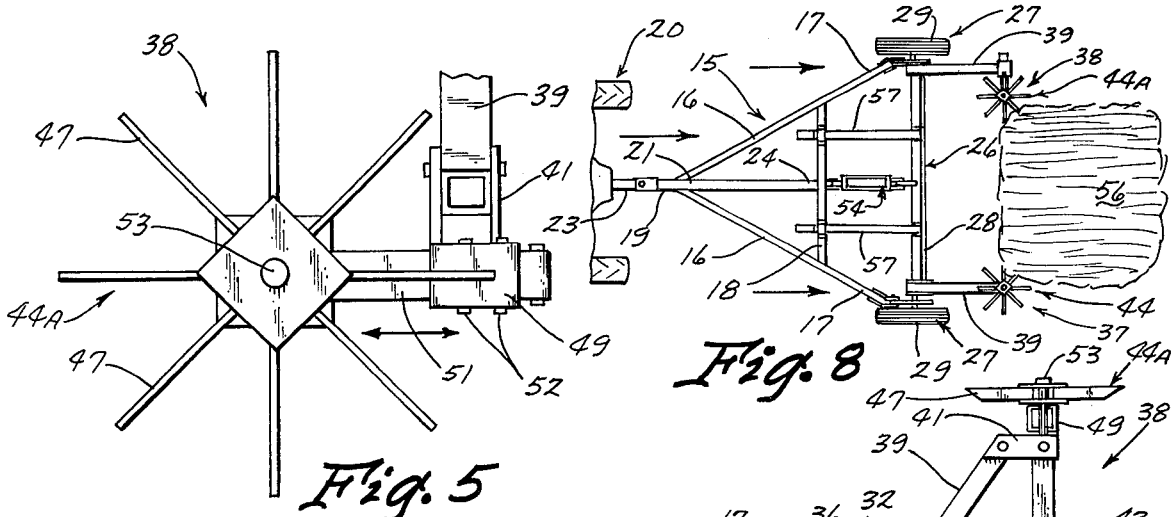
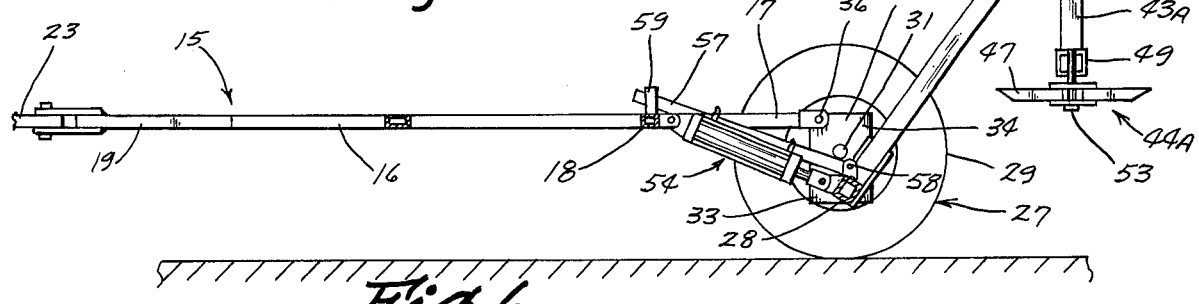
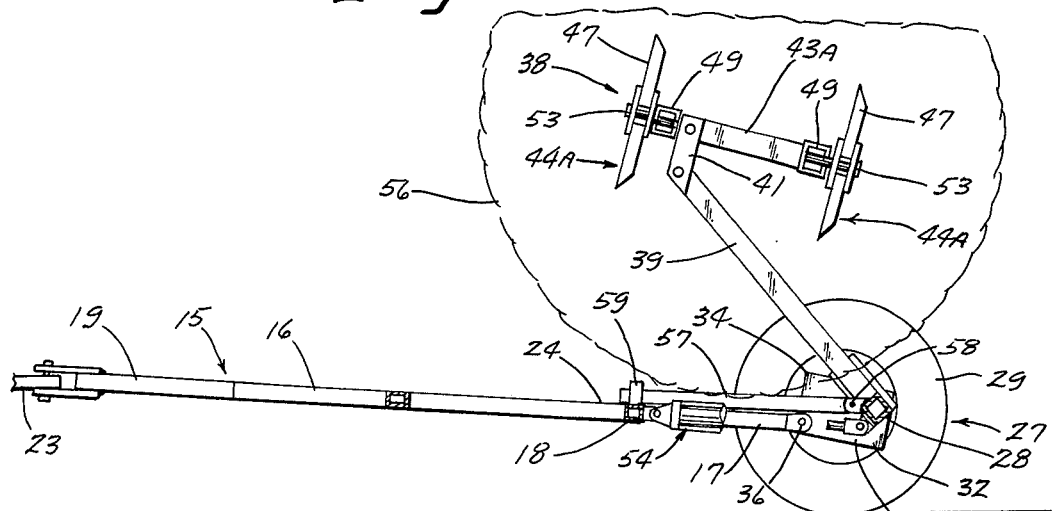
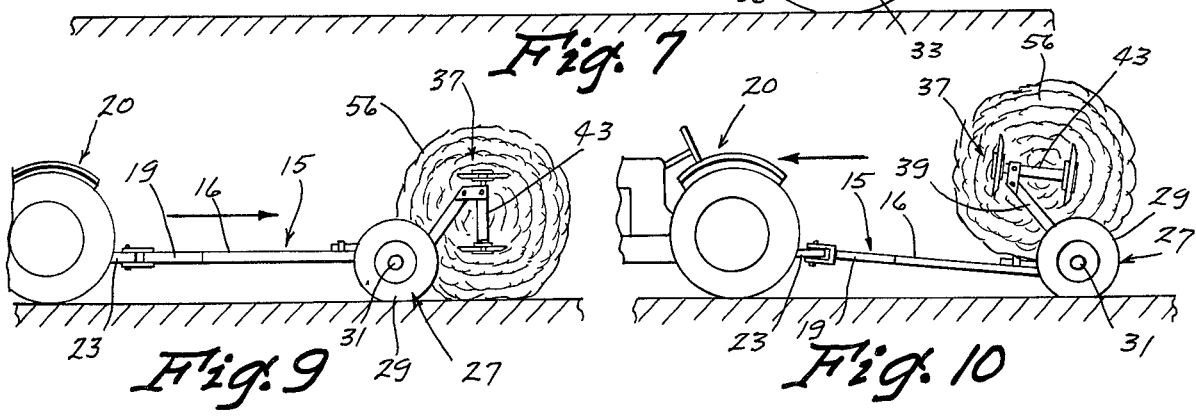

BALE HANDLING APPARATUS

SUMMARY OF THE INVENTION

The bale handling apparatus is of a simple and compact construction, readily connectible to a tractor for manipulation thereby, and efficient in operation to pick up and load a bale for transportation to a storage or feeding station. Rotatable finger units of the bale engaging and lifting structure are readily inserted within opposite ends of the bale, during loading and transport of the bale, and easily removed from the bale during unloading of the bale, without any resultant damage or injury to the bale. In transport, the bale is carried on the apparatus forwardly of its supporting wheels whereby the weight of the bale is directed downwardly onto the tractor.

BRIEF DESCRIPTION OF THE DRAWINGS

FIG. 1 is a perspective view of the bale handling apparatus of this invention with the bale engaging and lifting structure shown in a bale loading position;

FIG. 2 is an enlarged top plan view of the apparatus shown in FIG. 1;

FIG. 3 is an enlarged rear elevational view, as seen along line 3—3 in FIG. 2 of a first bale engaging and lift arm assembly that forms part of the lifting structure;

FIG. 4 is an enlarged rear elevational view of a second bale engaging and lift arm assembly taken along the line 4—4 in FIG. 2;

FIG. 5 is an enlarged elevational view as seen on line 5—5 in FIG. 4;

FIG. 6 is a side elevational view of the apparatus as shown in FIG. 2;

FIG. 7 is a side elevational view illustrated similarly to FIG. 6 showing the bale engaging and lifting structure in a bale transport position;

FIG. 8 is a diagrammatic top plan illustration showing the initial position of the apparatus relative to a bale to be loaded;

FIG. 9 is a diagrammatic side elevational view of the apparatus showing a bale located between and engaged by the bale engaging and lift arm assemblies of the bale engaging and lifting structure; and FIG. 10 is illustrated similarly to FIG. 9 and shows the bale in a transport position.

DETAILED DESCRIPTION OF THE INVENTION

Referring to FIGS. 1 and 2 of the drawings, the bale handling apparatus of this invention is illustrated as including a portable frame 15, of a generally triangular shape, in top plan view, having a pair of side members 16 with rear end sections 17 interconnected by a transverse member 18. A tongue member 19, which is secured to and bisects the forward apex portion 21 formed by the side members 16 has a front section connectible to the draw bar 23 of a tractor and a rear section 24 attached to the transverse member 18. A wheel and axle assembly for the portable frame 15, designated generally as 26, is comprised of a pair of transversely spaced wheel and axle units 27 connected together by a transverse beam 28.

Each wheel and axle unit 27 (FIGS. 1 and 6) includes a wheel 29 rotatable on an axle member 31 having rigidly attached to its inner end a lever member 32 comprised of a metal plate of a rectangular shape. An axle member 31 is secured to an associated lever member 32 at the central portion thereof to provide diametrically opposite lever arms 33 and 34 relative to the axis of the axle member 31. The transverse beam 28 is extended between and is connected to the lever arms 33 so as to form with the lever members 32 a transverse connecting means which secures the axle members 31 together in axial alignment.

The rear end sections 17 of the side members 16 have their terminal ends pivotally connected at 36 to adjacent lever arms 34 of the lever members 32. As best appears in FIG. 6, the connections of the transverse beam 28 and rear sections 17 of the side members 16 are located at substantially diagonally opposite positions on the plate shaped lever member 32 for a purpose to appear later.

Arranged at opposite ends of the transverse beam 28 (FIG. 2) are a pair of bale lifting and engaging assemblies 37 and 38 which define a bale engaging and lifting structure. The assemblies 37 and 38 hereinafter, for convenience, will be referred to as the "left" lift assembly and "right" lift assembly, respectively. Each assembly 37 and 38 includes an upright lift arm 39 adjustably secured at its lower end to the transverse beam 28 adjacent a lever member 32. The upper end of a lift arm 39 terminates in a lateral extension 41 comprised of a pair of transversely spaced connecting ears for receiving therebetween the upper end of an elongated support member 43. The support member 43 of the left lift assembly 37 is provided at each end thereof with rotatable finger assemblies 44 (FIG. 3). Each finger assembly 44 includes a hub member 46 equipped with radially extended fingers 47 and rotatably supported on a shaft 48. Each shaft 48 projects longitudinally outwardly from an adjacent end of the support member 43 so that the finger assemblies 44 are rotatable in parallel planes extended transversely of the support member 43. The finger assemblies 44 and support member 43 constitute a bale engaging unit which is carried at the free or upper end of the lift arm 39.

The support member 43a of the right lift assembly 38 (FIGS. 4 and 5) has secured to each end thereof a tubular guideway 49 of a rectangular shape in transverse cross section for adjustably receiving therein an associated slide member 51 for adjustable movement transversely of the support member 43a toward and away from the left lift assembly 37. Bolts 52 are positionable in a usual manner within aligned holes formed in a guideway 49 and slide member 51 to lock the slide member in an adjusted position.

The finger assemblies 44a of the right hand lift assembly 38 are similar to the finger assemblies 44 of the left lift assembly 37 and are rotatable on shafts 53 secured to the inner ends of the slide member 51 such that the finger assemblies are rotatable in planes extended transversely of the support member 43a. The lift assemblies 37 and 38 are relatively constructed so that the finger assemblies 44 and 44a are arranged transversely opposite each other with corresponding pairs thereof rotatable in substantially a common plane. When the support members 43 and 43a of the assemblies 37 and 38, respectively, are in substantially vertical positions (FIGS. 1, 2 and 6), their associated lift arms 39 are extended upwardly and rearwardly from the transverse connecting beam 28 to define a bale loading position of the assemblies 37 and 38. When the lift arms 39 are projected upwardly and forwardly from the transverse beam 28 (FIGS. 7 and 10), the lift assemblies 37 and 38 are in their bale transport positions.

For moving the lift assemblies 37 and 38, from the bale loading positions therefor, shown in FIG. 6, to their bale transport positions in FIG. 7, there is provided a hydraulic cylinder assembly 54 (FIG. 2) arranged in longitudinal alignment with the tongue member 19 for pivotal connection with the frame transverse member 18 and the transverse beam 28. With the cylinder assembly 54 in the retracted position thereof (FIG. 6) the portable frame 15 is substantially horizontal; the pivot connections 36 are located upwardly and forwardly of the axle members 31, and the transverse beam member 28 is located below the axle members 31. On a linear extension of the hydraulic cylinder assembly 54, the axle members 31 are rotatable within the wheels 29 to provide for a pivotal movement of the pivot connections 36 to positions forwardly and downwardly from the axes of the axle members 31 (FIG. 7) and of the transverse member 28 to a position spaced rearwardly of such axes. This pivotal movement of the lever members 32 relative to the axes of the wheel members in turn provides for the movement of the lift assemblies 37 and 38 from the bale loading position to the bale transport position, shown in FIG. 7, concurrently with a movement of the portable frame 15 from the horizontal position of FIG. 6 to a position inclined downwardly and rearwardly from its hitch connection with the tractor draw bar 23 (FIG. 7).

In the use of the bale handling apparatus of this invention, and as shown in FIG. 8, the lift assemblies 37 and 38 are initially adjusted relative to the length of the bale 56 to be loaded to provide lengthwise reception of a bale between the oppositely disposed hub members of the finger assemblies 44 and 44a. This bale length is variable with the bale forming machines of different manufacture so that the space adjustment between the lift assemblies is usually only a once-over adjustment in any one field. In the event of any length variation of a bale within a field, such is accommodated by the adjustment of the finger assemblies 44a on the right lift assembly 38 relative to the finger assemblies 44 on the left lift assembly 37.

With the lift assemblies 37 and 38 in their loading positions of FIGS. 6 and 8, the tractor, indicated at 20 in FIG. 9, is reversed so as to position the bale 56 between the lift assemblies and against the transverse beam 28. During this reversed travel of the tractor, the fingers 47 of the finger assemblies 44 and 44a are progressively moved into and out of inserted positions within the opposite ends of the bale 56 to their final positions shown in FIG. 9 wherein the finger assemblies 44 and 44a are located in the central portion of the bale at substantially diametrically opposite positions relative to the axis of the bale. With the bale thus positioned, the cylinder assembly 54 is actuated, from a usual oil power system with which the tractor 20 is equipped, to lift the table from its ground supported position in FIG. 9 to its transport position on the frame 15, shown in FIG. 10. In this transport position the bale 56 has the bottom side thereof resting on a pair of combination cylinder guard and bale support members 57 extended longitudinally above and at opposite sides of the cylinder assembly 54 (FIGS. 1 and 2). The rear end of each combination member 57 is pivotally connected at 58 to the transverse beam 28 and the forward end thereof is slidably supported within a guide member 59 secured to the top side of the transverse frame member 18.

Thus, concurrently with the lowering of the rear end of the portable frame 15, the bale 56 is supported on the frame at a position forwardly of the wheel axle members 31 so as to urge the frame downwardly on the tractor at the draw bar 23. In this transport position, the lift assemblies 37 and 38 hold the bale against movement laterally and longitudinally of the frame 15. When a bale 56 is to be unloaded, the lift assemblies are returned to the loading positions therefor and the tractor 20 is advanced to disengage the fingers 47 from the bale 56.

In the loading of the bale 56, it is not necessary to accurately align the bale relative to the finger assemblies 44 and 44a, as illustrated in FIG. 8. In other words, the bale may be inclined relative to the transverse beam 28 and off-set longitudinally relative to the finger assemblies. On backing of the apparatus into the bale, one or the other of the finger assemblies will ride along the forward side of the bale to effect a movement of the bale relative to the apparatus, or movement of the apparatus relative to the bale, until the finger assemblies are disposed at opposite ends of the bale. The loading operation will then proceed as above described.

Although the invention has been described with respect to a preferred embodiment thereof, it is to be understood that it is not to be so limited since changes and modifications can be made therein which are within the full intended scope of this invention as defined by the appended claims.

I claim:

1. A bale handling apparatus for lifting and moving a hay bale comprising:
   a. a portable frame,
   b. a pair of lift arms spaced transversely of said frame a distance apart to receive a bale lengthwise therebetween,
   c. means pivotally supporting said lift arms adjacent one end of said frame for up and down pivotal movement from a bale loading position to a bale transport position, and
   d. a bale engaging unit adjacent the free end of each lift arm engageable with one end of a bale to be handled, each bale engaging unit including a finger assembly rotatable in a substantially horizontal plane when a lift arm is in the bale loading position therefor whereby on advance of said one frame end toward a ground supported bale said finger assemblies are movable into engagement with the opposite ends of the bale.

2. The bale handling apparatus according to claim 1 including:
   a. a support member mounted adjacent the free end of each lift arm, and
   b. a pair of said finger assemblies rotatably mounted on each support member.

3. The bale handling apparatus according to claim 2, wherein:
   a. the finger assemblies, in each pair thereof, are spaced longitudinally of a support member and rotatable about a common upright axis when the lift arms are in the bale loading positions therefor.

4. The bale handling apparatus according to claim 1, wherein:
   a. each of said finger assemblies includes a rotatable hub member having a plurality of radially extended fingers,
   b. an elongated body member secured adjacent the free end of a lift arm such that when a lift arm is in the bale loading position therefor said body member is in a substantially vertical position, and c. means for rotatably supporting a pair of said finger assemblies on each of said body members for rotation in parallel planes about a common axis extended longitudinally of a body member.

5. The bale handling apparatus according to claim 4, wherein:
   a. the pair of finger assemblies on each lift arm are spaced a distance apart such that when a bale is positioned between the lift arms and adjacent said one frame end, the finger assemblies of each pair thereof are located at opposite sides of the longitudinal axis of the bale.

6. Bale handling apparatus for lifting and moving a hay bale comprising:
   a. a portable frame including a tongue structure connectible with a tractor and a pair of side members having rear end sections,
   b. a pair of transversely opposite wheel and axle units corresponding to said rear end sections, each of said units having a ground wheel rotatable on an axle member,
   c. transverse connecting means extended between and connected to the inner ends of said axle members,
   d. means pivotally connecting each of said rear end sections with said transverse connecting means,
   e. a pair of transversely spaced bale engaging and lifting assemblies each of which includes an upright lift arm having a lower end secured to said transverse connecting means and an upper end,
   f. a bale engaging unit at the upper end of each lift arm, each bale engaging unit including a rotatable finger assembly having a plurality of radially extended fingers, and
   g. a linearly extendible and retractible power unit pivotally connected to and extended between said frame and transverse connecting means,
   h. said lift arms movable by said power unit to a first bale loading position projected upwardly and rearwardly from said transverse connecting means wherein said fingers of the rotatable finger assemblies are progressively moved into and out of inserted positions within the opposite ends of a ground supported bale on a rearward movement of the portable frame, and to a second bale transport position projected upwardly and forwardly from said transverse connecting means wherein the bale is confined between said bale engaging units in a supported position on the frame forwardly of said axle members.

7. The bale handling apparatus according to claim 6, wherein:
   a. the axle members, transverse connecting means and bale engaging and lifting assemblies are pivotally movable together as a unitary structure relative to the axis of rotation of said wheel members in response to the extension and retraction of said power unit.

8. The bale handling apparatus according to claim 6 wherein:
   a. each of said bale engaging units includes an elongated body member with one of said rotatable finger assemblies adjacent each end thereof, each finger assembly including a hub member from which said plurality of fingers radially extend,
   b. means rotatably supporting said hub members on a body member for rotation in planes extended transversely of said body member, and
   c. means for securing a body member to a corresponding lift arm such that when the lift arms are in the first positions therefor, said body members are in substantially vertical positions.

9. The bale handling apparatus of claim 8 wherein:
   a. the body members are transversely spaced a distance apart such that the fingers on said hub members are rotatable for insertion within the central portion of a bale being loaded at positions to opposite sides of the longitudinal axis of the bale.

10. The bale handling apparatus according to claim 8, including:
    a. means for adjustably supporting the hub members on one of said body members for adjustable movement toward and away from the hub members on the other one of said body members.

11. The bale handling apparatus according to claim 6, wherein:
    a. said transverse connecting means includes a lever member secured to the inner end of each axle member and extended diametrically thereof, and a transverse beam member connected to and extended between one of the ends of said lever members, and
    b. said pivot means for connecting the rear end sections of the frame side members to the transverse connecting means located at the opposite ends of said lever members.

12. The bale handling apparatus according to claim 10 wherein:
    a. said transverse beam member is spaced below the axes of rotation of said wheel members when the lift arms are in the first positions therefor.

13. The bale handling apparatus according to claim 11, including:
    a. a rear transverse member extended between and connected to said frame side members,
    b. means pivotally connecting one end of said power unit to said transverse beam member,
    c. other means pivotally connecting the opposite end of said power unit to said rear transverse member, and
    d. bale support means arranged to opposite sides of and above said power unit and extended between and movably connected to said transverse member and transverse beam member to support said bale in the transport position therefor.

14. The bale handling apparatus according to claim 1, including:
    a. means for adjusting the bale engaging unit of at least one of said lift arms transversely of said portable frame to accommodate the handling of bales of different lengths.

* * * * *